Patented June 15, 1937

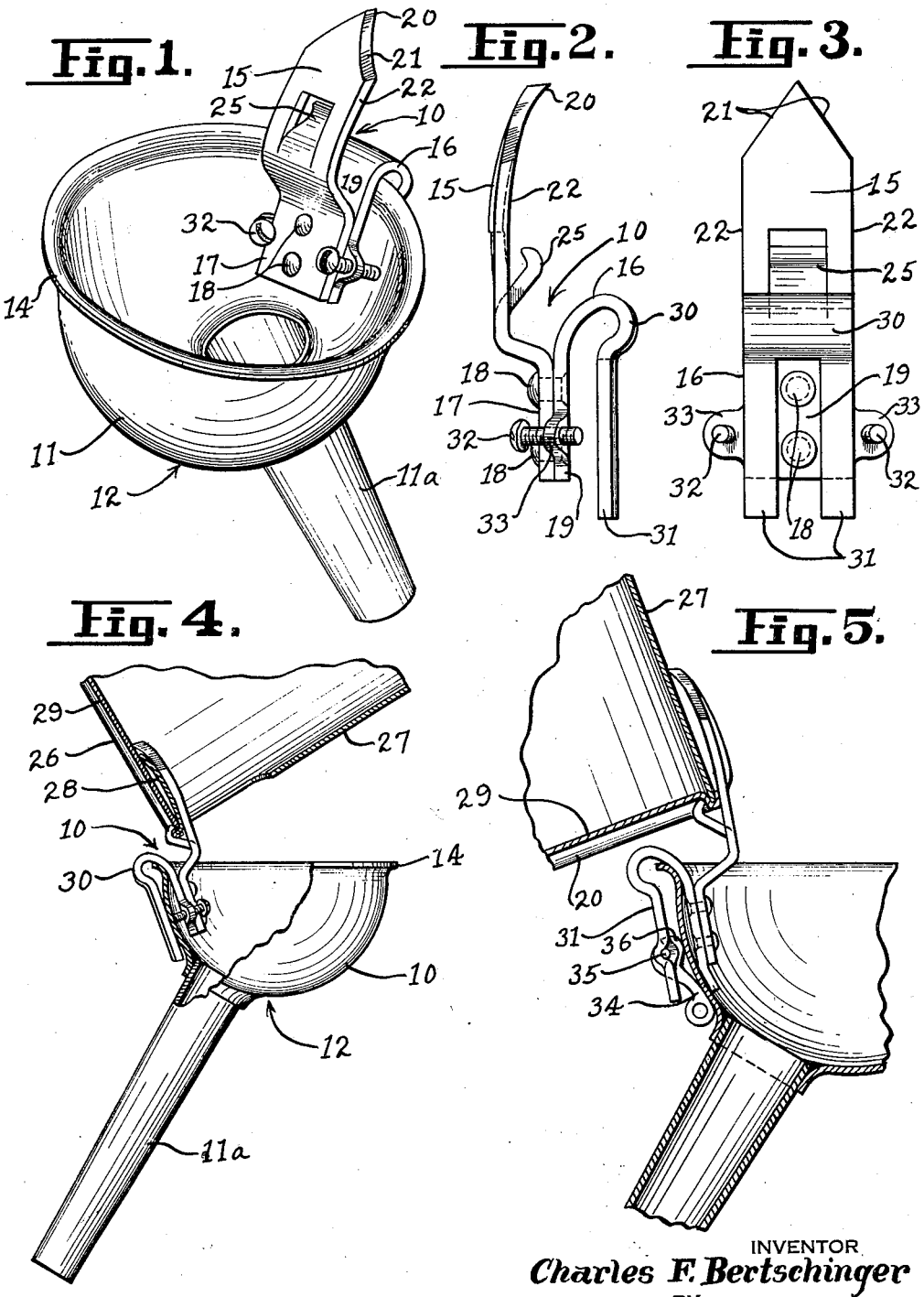

2,084,013

UNITED STATES PATENT OFFICE 2,084,013

CAN OPENING FUNNEL ATTACHMENT

Charles F. Bertschinger, Waterbury, Conn., assignor to The Scovill Manufacturing Company, Waterbury, Conn., a corporation of Connecticut Application May 2, 1934, Serial No. 723,519

15 Claims. (Cl. 221—23)

This invention relates to can opening devices and more particularly to a can opener adapted to be detachably secured to the bowl of a funnel or other dispensing device or receptacle.

One object of this invention is to provide a funnel attachment of the above nature by means of which the side wall of a sealed can may be punctured for causing the contents of said can to flow out into the funnel.

A further object is to provide a device of the above nature having detachable clamping engagement upon the rim of a funnel bowl and provided with a rigid cutter and fulcrum unit adapted to hook over the rim of a can, the spout of the funnel being used as a handle to cause said cutter to pierce the side wall of the can and the contents to flow into said funnel.

A further object is to provide a can opener funnel attachment of the above nature which will be simple in construction, inexpensive to manufacture, easy to assemble and manipulate, compact, and very efficient and durable in use.

With these and other objects in view, there have been illustrated on the accompanying drawing, two forms in which the invention may be conveniently embodied in practice.

In the drawing:

Fig. 1 represents a perspective view of the attachment as it appears when mounted on the bowl of a funnel.

Fig. 2 is a side view of the attachment, per se.

Fig. 3 is a front view of the same.

Fig. 4 is a side view of the assembled funnel and attachment, showing the appearance of a can after the side wall of the same has been pierced.

Fig. 5 shows a modified form of attachment with the can located in its initial position, just prior to the piercing operation.

Referring to the drawing in which like reference numerals denote corresponding parts throughout the several views, the numeral 10 indicates generally a can opener attachment which is adapted to be detachably secured to the bowl 11 of a funnel 12. The bowl 11 is herein illustrated as semi-spherical in shape, and preferably has a bell-mouthed flange 14 formed at its upper end. Attached to the bottom of the bowl and communicating therewith is a depending tapered spout 11a positioned at an angle of approximately 30 degrees to the vertical axis of the bowl 11. It will be understood, however, that the attachment may be applied to funnels of other shapes within the scope of the invention.

The can opening attachment consists essentially of a V-pointed convex cutting blade 15 which is rigidly joined to a U-shaped bowl engaging clip 16. The blade 15 is provided with an offset lower shank 17 by means of which said blade 15 may be permanently secured as by rivets 18 to the inner plate 19 of the U-shaped clip 16.

The upper part of the blade 15 has a forwardly directed puncturing point 20 from which sharp beveled cutting edges 21 diverge and then extend downwardly along the parallel side edges 22 of the blade 15.

The body of the blade is preferably bent slightly outwardly so as to increase the sharpness of the parallel cutting edges 21, 22 thereof.

The blade 15 is provided adjacent its lower end with an integral hooked lug or finger 25, preferably sheared out of the metal thereof and bent up to form a fulcrum for the rim 26 of a can 27.

In puncturing the aperture in the side of the can, the latter may be tilted rearwardly about the fulcrum finger 25 with sufficient force to cause the blade 15 to penetrate the side wall of the can and shear a tongue 28 therefrom.

As clearly shown in Fig. 4, the tongue 28 will be forced inwardly until it strikes against the can head 29, thus producing an aperture which extends to the end of the side wall, so that when the can is allowed to remain in this position, the contents thereof will be completely drained therefrom.

The upper end of the U-shaped funnel attaching clip 16 is provided with an outwardly bent loop 30 which is adapted to embrace the flared flange 14 of the funnel bowl 11. The front section of the clip 16 is bifurcated to form a pair of depending fingers 31, 31 which are adapted to bear against the exterior of the funnel bowl 11. This permits the clip to be attached over a seam in the funnel and also to fit upon funnels having a wide range of diameters.

In order to detachably secure the can-opener attachment 10 in place upon the funnel bowl 11, provision is made of a pair of oppositely inclined binding screws 32, 32 which are threadedly engaged in a pair of inclined side ears 33, 33 extending from the opposite side edges of the back plate 19 of the U-shaped clip 16. The screws 32 when screwed home are adapted to press tightly against the inner surface of the funnel bowl 11, and cooperate with the fingers 31, 31 to clamp the attachment in adjusted position upon the funnel bowl 11.

In the modified form of the invention shown in Fig. 5, the screws 32, 32 and lugs 33, 33 are omitted from the inner plate 19 of the U-shaped clip 16, and a quick releasable "snap-on" clamping lever 34 is mounted between the bifurcated fingers 31, 31 of said clip, said lever 34 being pivotally mounted within said fingers 31, 31 by means of a transverse pintle pin 35. The clamping lever 34 is provided with a cam-like head 36 which, when in locked position, is adapted to bear tightly against the outside surface of the funnel bowl 11.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to secure Letters Patent is:

1. In a can-opener attachment for a funnel, a U-shaped clip having means for detachably clamping upon the rim of the funnel bowl, and a cutter blade permanently and rigidly secured to the inner arm of said clip for piercing the wall of a can.

2. In a can-opener attachment for a funnel, a U-shaped clip having means for detachably clamping upon the funnel bowl, and a cutter blade permanently and rigidly secured to the inner arm of said clip for piercing the wall of a can.

3. In a can-opener attachment for a funnel, a U-shaped clip having means for detachably clamping upon the rim of the funnel bowl, and a cutter blade rigidly secured to the inner arm of said clip for piercing the wall of a can.

4. In a can-opener attachment for a funnel, a U-shaped clip having means for detachably clamping upon the rim of the funnel bowl, and a cutter blade permanently and rigidly secured to the inner arm of said clip for piercing the wall of a can, said cutter blade having a fulcrum hook integral therewith and adapted to be engaged by the rim of the can for supporting said can while it is swung about said hook for piercing an aperture in the side wall of the can.

5. In a can-opener attachment for a funnel, a U-shaped clip having means for detachably clamping upon the rim of the funnel bowl, and a cutter blade permanently and rigidly secured to the inner arm of said clip for piercing the wall of a can, said cutter blade having a fulcrum hook adapted to be engaged by the rim of the can for supporting said can while it is swung about said hook for piercing an aperture in the side wall of the can.

6. In a can-opener attachment for a funnel, a U-shaped clip adapted to embrace the rim of the funnel bowl, a cutter blade rigidly secured to the inner arm of said clip, and a pair of set screws mounted in said inner arm and adapted to press outwardly upon the inner surface of said bowl to clamp the attachment in operating position.

7. In a can-opener attachment for a funnel, a U-shaped clip adapted to embrace the rim of the funnel bowl, a cutter blade rigidly secured to the inner arm of said clip, and a pair of set screws mounted in said inner arm and adapted to press outwardly upon the inner surface of said bowl to clamp the attachment in operating position, the outer arm of said clip being bifurcated to provide a double bearing on the exterior surface of said bowl.

8. In a can-opener attachment for a funnel, a can piercing blade and can rim fulcrum rigidly connected as a unit, and means rigidly connected to said blade for detachably connecting said unit to the bowl of a funnel, said means comprising a U-shaped clip for embracing the rim of said bowl, the inner arm of said clip having a pair of opposed ears, and a pair of set screws passing through said ears for engaging the inner surface of said bowl to detachably clamp said clip upon said rim.

9. In a can-opener attachment for a funnel, a can piercing blade and can rim fulcrum rigidly connected as a unit, and means rigidly connected to said blade for detachably connecting said unit to the bowl of a funnel, said means comprising a quick releasable cam lever pivotally mounted in the outer arm of said clip.

10. In a can-opener attachment for a funnel, a can piercing blade and can rim fulcrum rigidly connected as a unit, and means rigidly connected to said blade for detachably connecting said unit to the bowl of a funnel, said means comprising a quick releasable cam lever pivotally mounted in one of the arms of said clip.

11. In a can-opener attachment for a tubular filling device, a U-shaped clip having means for detachably clamping upon the rim of the device, and a cutter blade permanently and rigidly secured to the inner arm of said clip for piercing the wall of a can.

12. In a can-opener attachment for a receptacle, a U-shaped clip having means for detachably clamping upon the receptacle, and a cutter blade permanently and rigidly secured to the inner arm of said clip for piercing the wall of a can.

13. A can opening device for use on an open topped dispensing device including, a body, cam means for removably attaching the body to the upper end portion of the dispensing device, and a projecting cutter on the body operable to open a can forced against it.

14. A can opening device for use on an open topped dispensing device including a body, a hook on the body for engaging over the upper edge portion of the dispensing device, means on the hook for removably attaching the body to the dispensing device, and a projecting cutter on the body operable to open a can forced against it.

15. A can opening device for use on a dispensing device having an outwardly flared lip on its upper end including, a body adapted to seat on the lip, a hook on the body adapted to engage over the outer edge of the lip, means on the hook for removably attaching the body to the dispensing device, and an upwardly projecting cutter on the body for opening a can to drain into the dispensing device.

CHARLES F. BERTSCHINGER.